United States Patent
Wan et al.

(10) Patent No.: US 11,794,726 B2
(45) Date of Patent: Oct. 24, 2023

(54) SYSTEMS AND METHODS FOR VIRTUAL VEHICLE PARKING ASSISTANCE BACKGROUND

(71) Applicant: Ford Global Technologies, LLC, Dearborn, MI (US)

(72) Inventors: Jian Wan, Dearborn, MI (US); Harald Martinez, Dearborn, MI (US); Michael A. Blommer, Dearborn, MI (US); Kenneth Michael Mayer, Dearborn, MI (US); Kwaku Prakah-Asante, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 17/487,694

(22) Filed: Sep. 28, 2021

(65) Prior Publication Data
US 2023/0102144 A1     Mar. 30, 2023

(51) Int. Cl.
*B60W 30/06* (2006.01)
*G08G 1/14* (2006.01)
(Continued)

(52) U.S. Cl.
CPC .......... *B60W 30/06* (2013.01); *B60W 30/085* (2013.01); *B60W 30/0956* (2013.01);
(Continued)

(58) Field of Classification Search
CPC ............... B60W 30/06; B60W 30/085; B60W 30/0956; B60W 50/14; B60W 60/001;
(Continued)

(56) References Cited

U.S. PATENT DOCUMENTS 10,366,610 B2   7/2019   Ha et al.
10,481,609 B2   11/2019  Moosaei et al.
(Continued)

FOREIGN PATENT DOCUMENTS

WO   WO-2022083135 A1 *   4/2022   ............ B60W 30/06

OTHER PUBLICATIONS

M. Khalid et al. "From Smart Parking Towards Autonomous Valet Parking: A Survey, Challenges and Future Works" (Nov. 2020).

*Primary Examiner* — Abby Y Lin
*Assistant Examiner* — Danielle Marie Jackson
(74) *Attorney, Agent, or Firm* — Brandon Hicks; Eversheds Sutherland (US) LLP (57) ABSTRACT

Systems and methods for virtual vehicle parking assistance are disclosed herein. An example method includes determining a current vehicle position and vehicle dimensions of a vehicle, determining parking space dimensions of a parking space, receiving a desired parking position for the vehicle through an augmented reality interface, the augmented reality interface including a three-dimensional vehicle model based on the vehicle dimensions, the augmented reality interface being configured to allow a user to virtually place the three-dimensional vehicle model in the parking space to determine the desired parking position, determining a virtual parking procedure for the vehicle based on the desired parking position selected by the user and the parking space dimensions of a parking space and causing the vehicle to autonomously park based on the virtual parking procedure.

20 Claims, 4 Drawing Sheets

(51) Int. Cl.
*B60W 50/14* (2020.01)
*B60W 30/095* (2012.01)
*B60W 30/085* (2012.01)
*B60W 60/00* (2020.01)
*G06T 19/00* (2011.01)

(52) U.S. Cl.
CPC .......... *B60W 50/14* (2013.01); *B60W 60/001* (2020.02); *G06T 19/006* (2013.01); *G08G 1/143* (2013.01); *B60W 2050/146* (2013.01); *B60W 2554/80* (2020.02); *G06T 2207/30264* (2013.01)

(58) Field of Classification Search
CPC ........ B60W 2050/146; B60W 2554/80; G06T 19/006; G06T 2207/30264; G08G 1/143
See application file for complete search history.

(56) References Cited

U.S. PATENT DOCUMENTS

| | | | |
|---|---|---|---|
| 10,732,622 B2* | 8/2020 | Bettger | B60W 50/14 |
| 10,737,689 B2 | 8/2020 | Kim et al. | |
| 2014/0176348 A1* | 6/2014 | Acker, Jr. | G08G 1/04 |
| | | | 340/932.2 |
| 2015/0127217 A1* | 5/2015 | Lee | G06V 20/588 |
| | | | 701/36 |
| 2018/0246515 A1* | 8/2018 | Iwama | G05D 1/0251 |
| 2018/0307919 A1* | 10/2018 | Hayakawa | G06V 20/588 |
| 2019/0084618 A1* | 3/2019 | Numata | B62D 15/0275 |
| 2020/0348442 A1* | 11/2020 | Banzhaf | G08G 1/165 |
| 2021/0276543 A1* | 9/2021 | Wang | B62D 15/0285 |
| 2022/0180299 A1* | 6/2022 | Väin | B60P 1/48 |
| 2022/0274589 A1* | 9/2022 | Gao | B60W 30/06 |
| 2022/0366792 A1* | 11/2022 | Gaβ | G01S 15/42 |

\* cited by examiner

SYSTEMS AND METHODS FOR VIRTUAL VEHICLE PARKING ASSISTANCE BACKGROUND

BACKGROUND

The effort required to safely and accurately park a vehicle in a desired space greatly affects the customer experience of a driver. Various vehicle parking assistance systems exist to minimize the driver's burden of parking a vehicle, especially in a narrow space, including automatic parking and remote parking using a mobile device, such as a smartphone.

However, there are several challenges in current solutions. For example, it may be difficult to determine if a parking space is large enough for vehicle entry. A non-centered/non-standardized vehicle position is sometimes preferred by a driver. In one use case, the user may desire an atypical path for ingress/egress of the vehicle, such as when the user desires easy access to unload packages from one side of the vehicle. In another use case, a user may desire to align an electrical vehicle with a wireless charging device proximate to a parking space. Additional considerations may be required in instances where one or more objects are attached to the vehicle (e.g., bicycle or cargo box on the roof). These objects may be forgotten, and when the vehicle is parked, these attached objects may potentially damage the vehicle, adjacent vehicles, and/or a parking structure.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure pertains to systems and methods for a digitally enhanced customized vehicle entry and parking assistant. The entry and parking assistant may use Augmented Reality (AR) technology such as AR eyewear or mobile AR to determine when a parking space is a sufficient size for the vehicle. When a vehicle is to be parked in a space, a virtual digital twin of the vehicle can be created that represents exactly the dimensional footprint of the vehicle. The driver can then "virtually park" the vehicle by positioning the digital twin into the desired parking space.

The system includes various components that include, but are not limited to a Vehicle Platform (VP), an Attachment Sensing Device (ASD), an Automatic Parking System (APS), and an Augment Reality Parking Assist (ARPA). The VP, ASD, APS, and ARPA may be located at the vehicle, over a remote network, and/or a combination thereof. The VP, ASD, APS, and ARPA may all be in communication with one another. In some instances, the ARPA may be implemented as an Augmented Reality (AR) application running on an AR device, such as AR eyewear, or a mobile device. The ARPA can also be implemented at the vehicle level using a vehicle infotainment system or other similar human-machine interface (HMI) of the vehicle.

The VP can store vehicle data, including, but not limited to, the current vehicle position and the vehicle dimensions, as well as historical preferences, such as previous customized parking positions.

The ASD can detect whether one or more attachments, such as a cargo box or bicycles, are attached to the vehicle. The ASD may detect any objects attached to the vehicle. The ASD can identify the position of attachment(s), such as at the rear of the vehicle or on the roof of the vehicle, utilizing built-in sensors on the vehicle, as well as transmit attachment status, location, and dimensions to the VP. In some instances, additional sensors may be added to the vehicle to supplement the build-in sensors.

The APS can receive a preferred vehicle parking location (referred to herein as a "desired parking position") from the VP. The APS implements algorithms that use data about the current vehicle position and the desired parking position and automatically calculate an optimized path for the vehicle. The APS can autonomously control the vehicle to navigate this optimized path to move from the current vehicle position to the desired parking position. In this manner, the APS may autonomously park the vehicle.

The ARPA can display the digital twin (e.g., three-dimensional vehicle model) of the vehicle on the AR device, provide a user interface for the driver to selectively position the digital twin in the desired parking position on the AR interface, and communicate with the VP.

In one example use case, the VP can retrieve an attachment status from the ASD. The VP can transmit vehicle dimensions and any attachment status to the ARPA. Based on the information received from the VP, the ARPA may generate a virtual vehicle, which is a three-dimensional vehicle model. The three-dimensional vehicle model can be projected into the AR space based on the vehicle dimensions and current position of the physical vehicle.

The ARPA can create a bounding box around the vehicle and/or the attached object that includes the size(s) and position(s) of attachment(s) currently attached to the vehicle. The AR device can be used to see the virtual vehicle ("digital twin") generated above. The driver can position the virtual vehicle to virtually park in the desired parking position. The manipulation operation could include a user shifting the vehicle forward/backward, left/right, and modifying the vehicle's heading through the AR display.

Once the desired parking position is chosen, a virtual parking procedure can be executed to determine if the desired parking position can be achieved. During the virtual parking procedure, the driver may continually monitor the maneuver, visually verifying the entrance and space is large enough for the vehicle and if any attachment on the vehicle will collide with a physical obstruction around the parking space, such as the roof of a garage. This verification process can also be carried out automatically inside the ARPA in which the bounding box of virtual vehicle (virtual model or vehicle model) is compared against the physical parking space. The dimensions of the physical parking space can be scanned by depth cameras built into the AR device or the vehicle every time the virtual vehicle moves. Any interference between the two can be indicated to the driver through the display of the AR device.

The driver can fine-tune the desired parking position of the virtual vehicle through the AR device in order to incorporate personal preferences for vehicle position in the parking space. For example, if there are space constraints on the left (e.g., another parked vehicle or a wall), the driver may want the vehicle to be biased more to the right allowing more room on the left side for the driver to ingress/egress or easier to load/unload packages from the left side of the vehicle. The virtual parking procedure can be considered to be complete when the vehicle can be moved from its current location to the desired parking position, and no constraints exist. That is, no potential collisions or impingements are detected.

After the virtual parking procedure is complete, the ARPA can transmit the customized vehicle parking position back to the VP wirelessly. The VP conveys the desired parking position to the APS. The APS can calculate an vehicle path (referred to herein as an "autonomous parking procedure") from the current position to the desired parking position and autonomously moves the vehicle to the desired space. After successful parking, the VP can store the parameters for a customized parking position. When this vehicle returns to the same parking space, the driver can choose to reuse the previously saved parameters for customized parking.

Illustrative Embodiments

Figure 1:
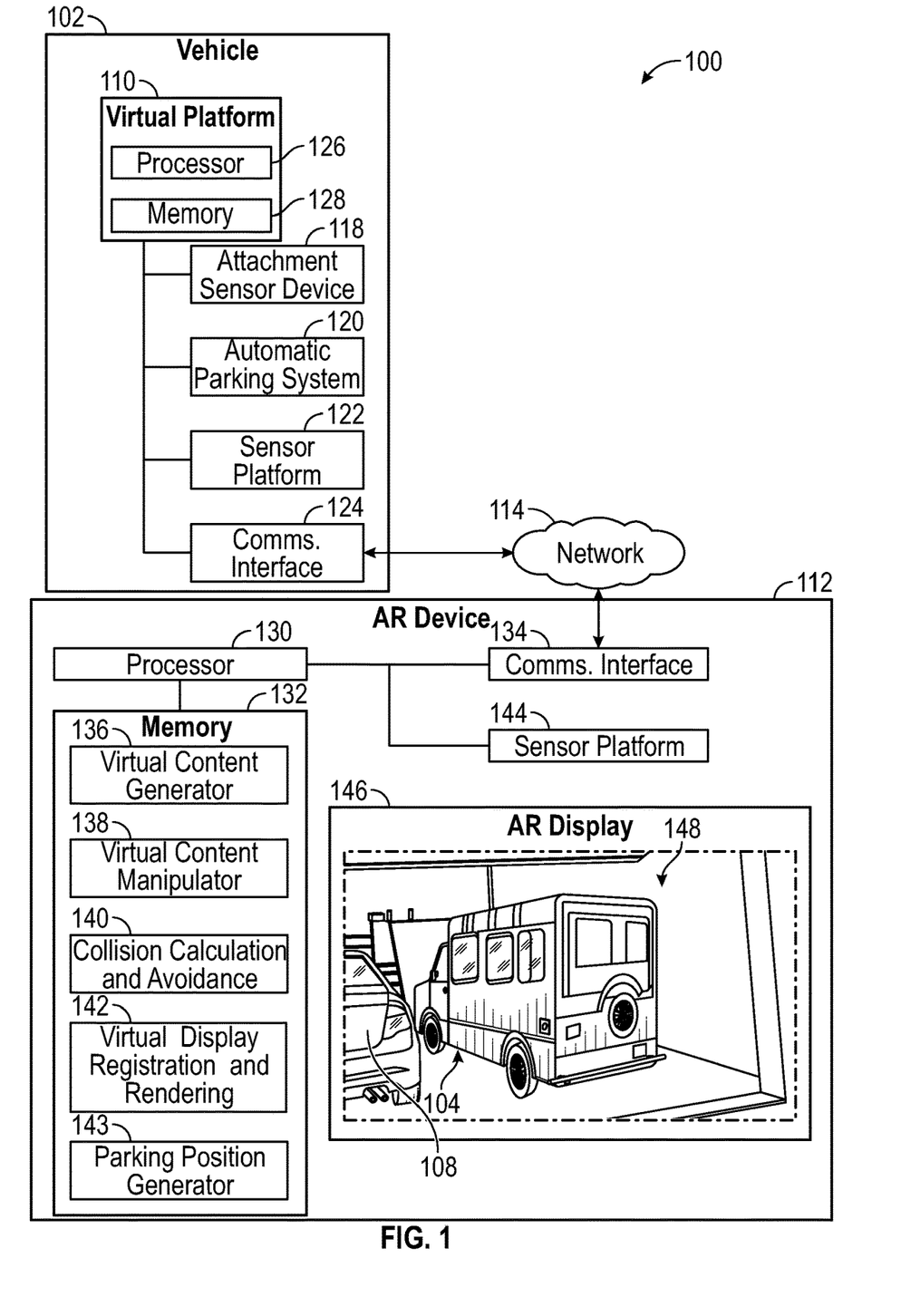
FIG. 1 illustrates an example architecture in accordance with one or more embodiments of the present disclosure.

Turning now to the drawings, FIG. 1 depicts an illustrative architecture 100 in which techniques and structures of the present disclosure may be implemented. The architecture 100 includes a vehicle 102 that is attempting to park in a parking space 104. In the example of FIG. 1, the parking space 104 is in a garage that is bounded by a garage ceiling or door, and the second vehicle 108 is adjacent to the parking space 104. While this specific scenario will be discussed in greater detail herein, this example is for descriptive purposes only. The aspects of the present disclosure disclosed herein can be applied in any scenario where a user desires to determine if a vehicle can be parked in a particular location prior to attempting the parking procedure.

The vehicle 102 can comprise a vehicle platform 110 that communicates with an AR device 112 to provide a virtual parking assistance feature to the driver of the vehicle 102. Some or all of these components in the architecture 100 can communicate with one another using the network 114. The network 114 can include combinations of networks that enable the components in the architecture 100 to communicate with one another. The network 114 may include any one or a combination of multiple different types of networks, such as cellular, cable, the Internet, wireless networks, and other private and/or public networks. In some instances, the network 114 may include Wi-Fi or Wi-Fi direct. The components of the architecture 100 can also communicate over short-range or radiofrequency links such as Bluetooth or ultra-wideband (UWB).

The vehicle 102 may also comprise an attachment sensor device 118, an automatic parking system 120, a sensor platform 122, and a communications interface 124. The vehicle platform 116 may comprise a processor 126 and memory 128 for storing instructions. The processor 126 executes instructions stored in memory 128 to perform any of the methods disclosed herein. When referring to actions performed by vehicle platform 116 or vehicle 102, this implicitly involves the execution of instructions by the processor 126. In general, the vehicle platform 116 can utilize the communications interface 124 to transmit and/or receive data over the network 114 or a short-range wireless link.

The attachment sensor device 118 can include any number of sensors or mechanisms used to determine, detect, or sense the presence of an attachment or object on the vehicle 102. The attachment sensor device 118 can detect whether one or more attachments, such as a cargo box or bicycles, are attached to the vehicle. If an attachment is detected, the attachment sensor device 118 can output an attachment status, attachment location, and attachment dimensions to the vehicle platform 116.

An example attachment could include, but is not limited to, a bicycle and/or a wheelchair. When the vehicle is a truck, the attachment could include items loosely or securely stored in a bed of the truck. In one example, if the attachment is a bicycle, the bicycle may be attached to a bike rack on the roof of the vehicle, or a bike rack behind the vehicle. The attachment sensor device 118 could include any sensor that is capable of detecting the mating of the bicycle to the bicycle rack, similarly to a seatbelt buckle sensor that detects when a seatbelt has been buckled. In another example, the attachment sensor device 118 could include a pressure sensor that detects a weight of an object placed on a roof rack of the vehicle.

In yet another example, the attachment sensor device 118 could be used in combination with a camera or plurality of cameras of the sensor platform 122 of the vehicle 102 that can be used to detect attachments. For example, the attachment sensor device 118 can be used to detect the presence of an attachment, whereas the sensor platform 122 can be used to detect the type of attachment and/or a size (e.g., dimensions) of the attachment.

For example, the sensor platform 122 can include cameras directed to attachment sites on the vehicle. Once images are obtained, the attachment sensor device 118 can use image recognition algorithms to detect attributes of attached objects. To be sure, the sensor platform 122 can include various include sensors mounted on the vehicle, such as cameras, LIDAR, IR, ultrasonic, and the like. Again, the attachment sensor device 118 can output an attachment status, attachment location, and attachment dimensions to the vehicle platform 116.

The vehicle platform 116 can determine and/or store pertinent vehicle data, including, but not limited to, a current vehicle position and vehicle dimensions. For example, the vehicle platform 116 can obtain a current vehicle position from GPS signals, or using other similar technologies. The vehicle platform 116 can obtain attachment data from the attachment sensor device 118 and provide the same to the AR device 112, along with the current vehicle position and vehicle dimensions.

The AR device 112 can comprise a processor 130 and memory 132 for storing instructions. The processor 130 executes instructions stored in memory 132 to perform any of the methods disclosed herein. When referring to actions performed by the AR device 112, this implicitly involves the execution of instructions by the processor 130. In general, the AR device 112 can utilize the communications interface 134 to transmit and/or receive data over the network 114 or a short-range wireless link. For example, the AR device 112 can communicate with the vehicle platform 110 over the network 114.

In general, based on the information received from the vehicle platform 110, the AR device 112 can generate a virtual vehicle ("three-dimensional representation") that is positioned in an AR display, based on the vehicle dimensions and current position of the physical vehicle. The AR device 112 can also create a bounding box including the sizes and positions of all attachments currently attached to the vehicle.

The AR device 112 can include a virtual content generator module 136, a virtual content manipulator module 138, a collision calculation and avoidance module 140, a virtual display rendering and registration module 142, and parking position generator 143. The virtual content generator module 136 can be configured to create a virtual replica of the vehicle based on vehicle size received through a communication module. The virtual content generator module 136 can obtain images from a camera of a sensor platform 144 of the AR device 112. To create an augmented reality display, the virtual content generator module 136 overlays the virtual vehicle representation at the current location of the physical vehicle. The virtual content generator module 136 can also generate the bounding boxes of all the attachments currently attached to the vehicle.

The AR device 112 includes an AR display 146. In general, display 146 can include an augmented reality interface configured to allow a user to virtually place a three-dimensional vehicle model 148 in the parking space 104 to determine a desired parking position for the vehicle. The AR display 146 includes an AR experience that comprises, if using a hand-held mobile AR or a video see-through AR wearable, images obtained by a camera of the AR device and/or the vehicle of a parking space, with the virtual vehicle overlaid on the images, or if using an optical see-through AR wearable, the virtual vehicle being directly overlaid with the physical parking space. The AR display 146 included user interface elements that allow a user to interact with the virtual vehicle. This can include a navigation pane 150 where the user can adjust the position of the virtual vehicle left/right, forward/back, and/or a vehicle heading to place the virtual vehicle in the desired parking position. In the example of FIG. 1, the vehicle model 148 can be directed into a desired parking position in the parking space 104. The user can select the desired parking position by adjusting the vehicle using the navigation pane 150.

The user can interact with the AR device using technology such as a gaze pointer, hand gesture, voice command, and so forth. For example, a depth camera built into the AR device (the AR device can include its own sensor platform 144 having cameras or other sensors as disclosed with respect to the vehicle) may capture the user's hand gesture such as click or pinch to trigger various logic in virtual content manipulator to shift the vehicle model 148 forward/backward or left/right and change orientation.

The virtual content manipulator module 138 can effectuate the user manipulation of the vehicle model 148 in AR display 146, which includes, but is not limited to, shifting vehicle in different directions, toggling the display of the attachment bounding box on vehicle, and so forth.

Once the desired parking position has been selected, a virtual parking procedure for the vehicle can be executed based on the desired parking position selected by the user and the parking space dimensions of a parking space. The virtual parking procedure is a mimicked procedure allowing the virtual vehicle to be driven from its current position into the desired parking position. Part of this process involves executing the collision calculation and avoidance module 140 can compare surfaces of vehicle model 148 with the physical constraints of the parking space and its surroundings as the virtual content changes position during the virtual parking procedure. The physical constraints (such as a wall or ceiling) can be in (but not limited to) the format of a three-dimensional point cloud that can be obtained through scanning of the parking space and its surroundings by cameras built into the AR device or the vehicle.

The virtual parking procedure includes virtually moving the vehicle model 148 into the parking space. The dimensions of the parking space can be determined from vehicle sensors. The dimensions can include not only width, but also depth (length), and height above the parking space.

The collision calculation and avoidance module 140 can determine the likelihood of a collision based on the modeling. If a potential collision is detected during the virtual parking procedure, the occurrence and position of a collision can be displayed to the driver through the AR display 146. For example, the collision calculation and avoidance module 140 can highlight or otherwise mark areas on the virtual vehicle that may be impacted. The collision calculation and avoidance module 140 can also compute an alternative vehicle position that is the closest to the desired position and avoid the collision through a collision avoidance algorithm. Thus, the desired parking position can be adjusted to avoid the collision. In addition to collision, the collision calculation and avoidance module 140 can detect when the vehicle may be placed too close to an adjacent vehicle or other object making ingress/egress of the vehicle difficult.

The virtual display rendering and registration module 142 can register the vehicle model with the physical world utilizing the technology of SLAM (simultaneous localization and mapping) or image marker tracking and renders the result to create the mixed reality in the AR display. After registering, the virtual content may fix or anchor to the physical world in space, no matter where the viewpoint of the AR device is oriented. This allows the driver to step out of the vehicle and closely monitor the virtual parking to achieve a precise parking position.

After the driver finalizes the desired parking position through the AR display 146, the parking position generator module 143 computes a relative position and orientation from the current position of the vehicle. The parking position generator module 143 transmits the result back to the vehicle platform 110. The result can include an autonomous parking procedure that can be executed by the automatic parking system 120 of the vehicle 102.

It will be understood that while the AR device has been disclosed as being a separate device, some or all of the functionalities of the AR device can be implemented at the vehicle level, as an infotainment option. Also, the present disclosure contemplates using an autonomous parking procedure. However, the virtual parking procedure can be performed to allow a user to virtually park their vehicle, identify potential collisions, and manually park the vehicle in the desired parking position when no collisions or other warnings are determined during the virtual parking procedure.

During the AR-enhanced virtual parking experience, the driver may continually monitor parking maneuvers, visually verifying the entrance and space is large enough for the vehicle and if any attachment on the vehicle may collide with a physical obstruction around the parking space, such as the roof of the garage. This checking process can also be carried out automatically inside the AR device (as noted above) in which the bounding box of the virtual vehicle is compared against the physical parking space scanned by depth cameras built into the AR device or the vehicle as the virtual vehicle moves during the virtual parking procedure. The user can also select a transparency level for the vehicle model 148. For example, the user can select to make the vehicle model 148, allowing for the user to see what is around the vehicle model 148 when parked in the desired parking position. This allows the user to at least partially "see through" the vehicle and observe the objects around the vehicle that may be obscured by the vehicle model 148.

Advantageously, the driver can fine-tune the destination position of the virtual vehicle through the AR device in order to incorporate personal preferences for vehicle position in the parking space. For example, if there are space constraints on the left (e.g., another parked vehicle or a wall), the driver may want the vehicle to be biased more to the right allowing more room on the left side for the driver to ingress/egress or easier to load/unload packages from the left side of the vehicle.

In sum, after the virtual parking procedure is completed, AR device 112 sends back the customized vehicle parking position to the vehicle platform 110. With the confirmation of no collision and ready to park from the driver, the vehicle platform 110 conveys the desired parking position to the automatic parking system 120. The automatic parking system 120 calculates the vehicle path from the current position to the desired parking position and automatically moves the vehicle to the desired space. In some instances, the automatic parking system 120 converts the virtual parking procedure into an autonomous parking procedure.

After successful virtual parking, the vehicle platform 110 can store the parameters for a customized parking position. When this vehicle returns to the same parking space, the driver can choose to reuse the previously saved parameters for customized parking.

Figure 2:
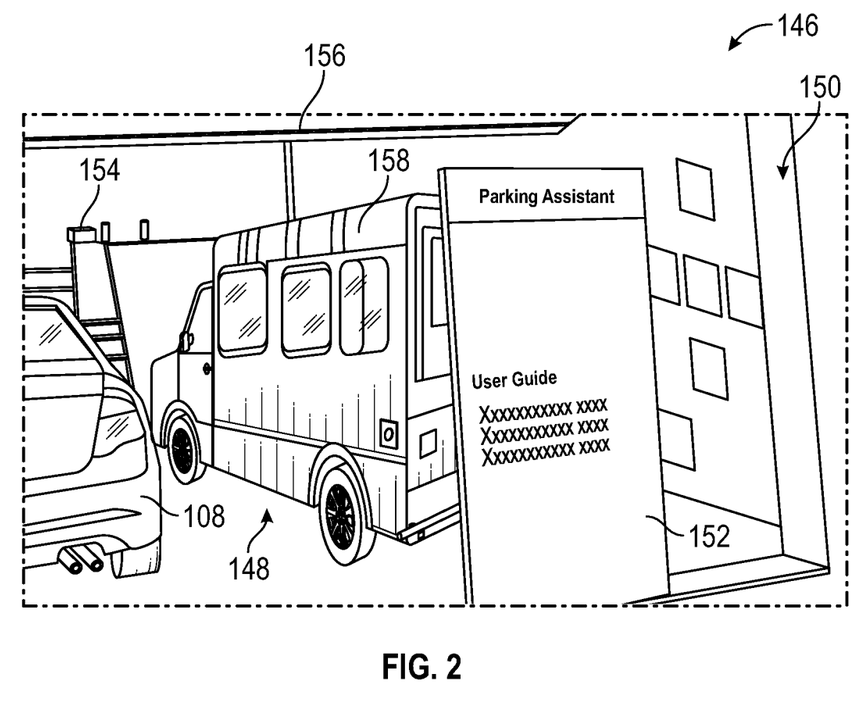
FIG. 2 is a close-up of a screenshot of a virtual parking procedure in accordance with one or more embodiments of the present disclosure.

FIG. 2 is a close-up screenshot of the AR display 146 of FIG. 1. The AR display 146 includes an image or a physical scene 154 of the parking space 104. The parking space 104 is located inside a garage of a home. The parking space 104 has an upper height that is bounded by a garage door opening 156. The second vehicle 108 is located on a left-hand side of the garage. A driver of the vehicle would like to park the vehicle in the parking space 104 and would like to ensure that the vehicle can enter the garage while having contents stored on its roof. In this example, the vehicle model 148 includes a three-dimensional model of the vehicle, which can be built based on data obtained from an original equipment manufacturer (OEM) or another authoritative source. The vehicle model 148 also includes a bounding box 158 that represents a size and shape of the contents stored on the roof of the vehicle. For example, the vehicle may have luggage stored on the roof.

In this example, the user can utilize the navigation pane 150 on the AR display 146 to reposition the vehicle model 148. The navigation pane 150 can include buttons to move the vehicle forward, reverse, left, and right, as well as a button that allows the user to change a heading of the vehicle model 148. Information regarding the parking process can be displayed on an information pane 152. The information pane 152 can include information about potential collisions, parking space size, and so forth.

In one example use case the user can select to move the vehicle model 148 slightly to the right in order to ensure sufficient room for the drive to open their door without hitting the second vehicle 108. Once the user has selected their desired parking position, coordinates for the desired parking position are identified compared with the current vehicle position. A virtual parking procedure is determined that includes steering and forward/reverse operations that are required to drive the vehicle from its current location to the desired parking position. The virtual parking procedure can also be analyzed to ensure that the vehicle model 148 with the bounding box 158 can fit underneath the garage door opening 156. When the overall height of the vehicle model 148 and bounding box 158 is equal to or possible taller than a height of the garage door opening 156, a collision is likely and can be identified to the driver.

As noted above, the user can request these functionalities from an AR device used inside the vehicle. Also, the user can request these functionalities from an AR device as the user stands outside the vehicle. For example, the AR device could include a user's smartphone. The user can select a desired parking position, perform a virtual parking procedure, and monitor an autonomous parking procedure while being outside the vehicle. This allows the driver to gain different viewpoints of the vehicle as it is being driven into the parking space. The user can also signal the vehicle to an emergency stop through the AR device if the driver determines that the vehicle may be likely to have a collision. The parking procedure can also be terminated when a sensor of the vehicle senses an impending collision. For example, radar or ultrasonic sensors positioned around the vehicle may sense when a portion of the vehicle is about to impact an object.

Figure 3:
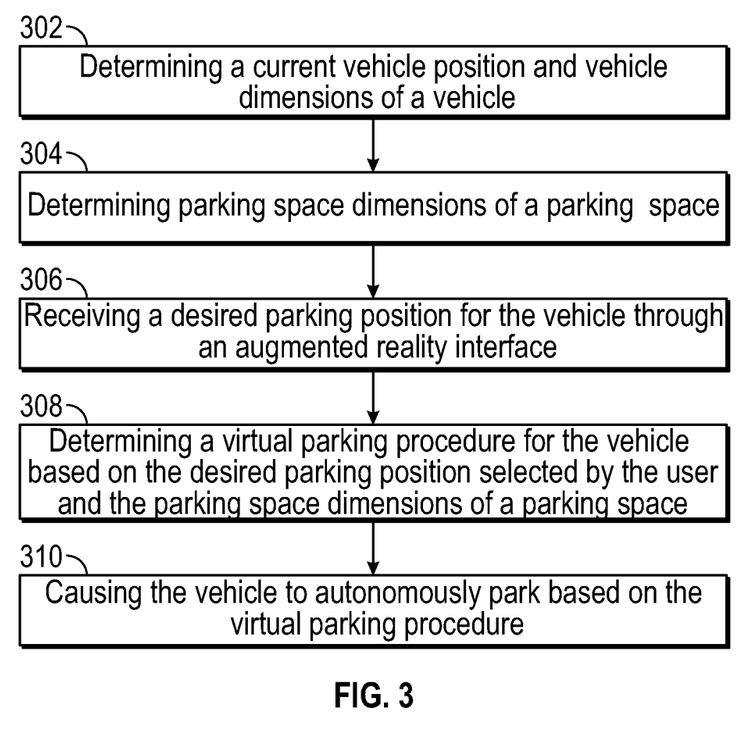
FIG. 3 is a flowchart of an example method in accordance with one or more embodiments of the present disclosure.

FIG. 3 is a flowchart of an example method. The method includes a step 302 of determining a current vehicle position and vehicle dimensions of a vehicle. Determining the current vehicle position can be done through analysis of GPS data. Determining vehicle dimensions can be accomplished by obtaining the vehicle dimensions from memory in a vehicle platform. The vehicle dimensions could also be obtained over a network from a service provider or other online resource.

Next, the method can include a step 304 of determining parking space dimensions of a parking space. For example, sensors of a vehicle or AR device can detect the parking space dimensions. In some instances, parking space dimensions can be obtained from an infrastructure resource, such as a parking garage.

The method can include a step 306 of receiving a desired parking position for the vehicle through an augmented reality interface. As noted above, the augmented reality interface can comprise a three-dimensional vehicle model based on the vehicle dimensions. The three-dimensional vehicle model can be placed or overlaid onto images or the physical scene of the parking space. The augmented reality interface may be configured to allow a user to virtually place the three-dimensional vehicle model in the parking space to determine the desired parking position. To be sure, the desired parking position is customizable. Thus, the driver can select not only to park in the parking space in general, but to preferentially locate their vehicle inside the parking space, rather than squarely in the middle of the parking space.

The method may also include a step 308 of determining a virtual parking procedure for the vehicle based on the desired parking position selected by the user and the parking space dimensions of a parking space. The virtual parking procedure allows the driver to predictively analyze how the vehicle would enter the parking space if the vehicle were to be parked in the desired parking position. The virtual parking procedure may identify potential collisions. That is, the virtual parking procedure comprises determining the clearance of the vehicle with respect to a physical object adjacent to the parking space as the vehicle is being virtually driven into the parking space during the virtual parking procedure and virtually parked in the desired parking position.

When no collisions are detected, the desired parking position can be used to create an autonomous parking procedure. Thus, the method includes a step 310 of causing the vehicle to autonomously park based on the virtual parking procedure. For example, the virtual parking procedure can be converted into specific vehicle operations that can be performed autonomously.

The method can include storing the desired parking position to allow the user to reuse the desired parking position. The desired parking position can be stored in memory of a vehicle platform for future use. In one instance, the method can include determining that the vehicle is at the parking space, retrieving the desired parking position that is stored in memory, and causing the vehicle to park in the parking space at the desired parking position.

Figure 4:
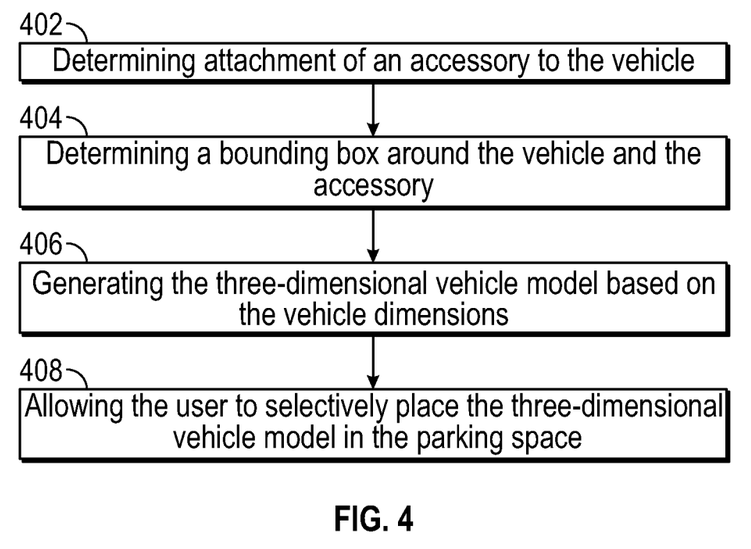
FIG. 4 is a flowchart an example method in accordance with one or more embodiments of the present disclosure.

FIG. 4 is another example method of the present disclosure. The method can include a step 402 of determining attachment of an accessory to the vehicle. The vehicle dimensions also comprise dimensions of the accessory. The method can also include a step 404 of determining a bounding box around the vehicle and the accessory. As noted above, the bounding box is utilized during the virtual parking procedure to determine collisions when attachments are associated with the vehicle.

The method may also include a step 406 of generating the three-dimensional vehicle model based on the vehicle dimensions, as well as a step 408 of allowing the user to selectively place the three-dimensional vehicle model in the parking space. To be sure, the vehicle model may include the bounding box created to represent the accessories (if present).

Figure 5:
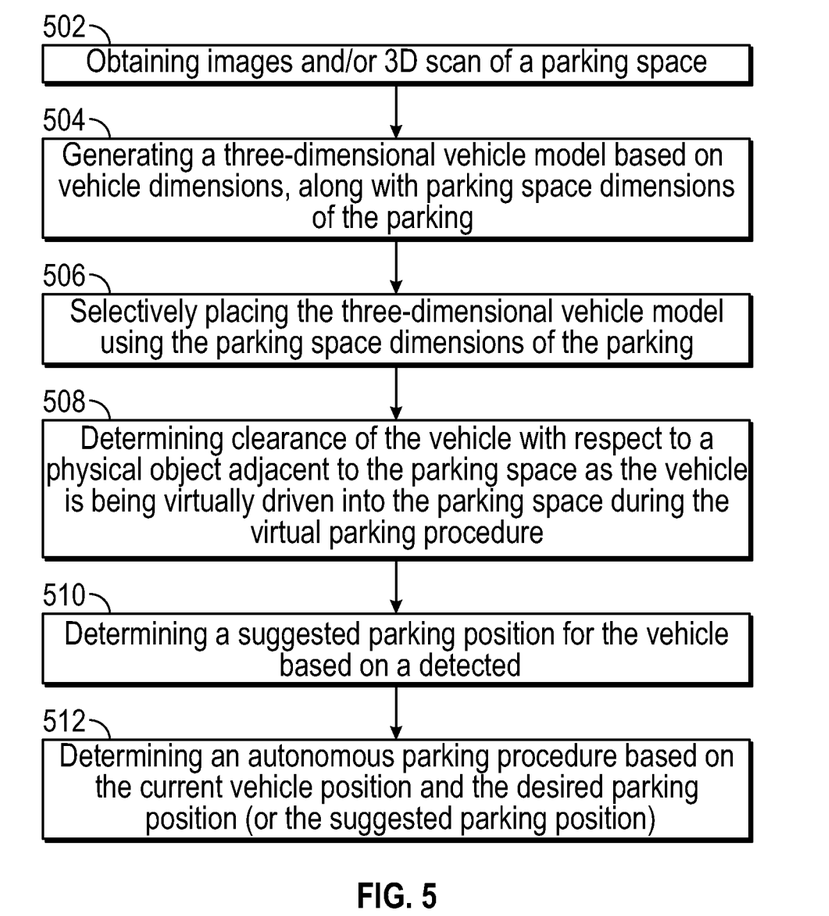
FIG. 5 is a flowchart of an example method in accordance with one or more embodiments of the present disclosure.

FIG. 5 is a flowchart of yet another example method. The method can include a step 502 of obtaining images and/or 3D scan of a parking space. This can be accomplished using cameras mounted on a vehicle. The method can include a step 504 of generating a three-dimensional vehicle model based on vehicle dimensions, along with parking space dimensions of the parking space.

The method can include a step 506 of selectively placing the three-dimensional vehicle model using the parking space dimensions of the parking space. This selective placing can occur based on user input into an AR device that presents an AR experience that includes the vehicle model imposed on the images obtained or the physical scene of the parking space.

The method can further include a step 508 of determining clearance of the vehicle with respect to a physical object adjacent to the parking space as the vehicle is being virtually driven into the parking space during the virtual parking procedure. This can include comparing surfaces of the three-dimensional vehicle model with physical constraints imposed by the physical object as the three-dimensional vehicle model changes position. Alternatively, the method includes a step 510 of determining a suggested parking position for the vehicle based on the collision. The method includes a step 512 of determining an autonomous parking procedure based on the current vehicle position and the desired parking position (or the suggested parking position).

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a current vehicle position and vehicle dimensions of a vehicle;
   determining parking space dimensions of a parking space;
   receiving a desired parking position for the vehicle through an augmented reality interface, the augmented reality interface comprising a three-dimensional vehicle model based on the vehicle dimensions, the three-dimensional vehicle model being placed onto images or a physical scene of the parking space, the augmented reality interface being configured to allow a user to virtually place the three-dimensional vehicle model in the parking space to determine the desired parking position;
   determining a virtual parking procedure for the vehicle based on the desired parking position selected by the user and the parking space dimensions of the parking space; and
   causing the vehicle to autonomously park in the desired parking position based on the virtual parking procedure, wherein the desired parking space is customizable in order to allow the vehicle to be parked offset from a middle of the parking space.

2. The method according to claim 1, wherein the virtual parking procedure comprises determining clearance of the vehicle with respect to a physical object adjacent to the parking space as the vehicle is being virtually driven into the parking space during the virtual parking procedure and virtually parked in the desired parking position without adjusting the desired parking position, and wherein the vehicle model has an adjustable transparency level in order to allow the user to see what is around the vehicle model when parked in the desired parking position.

3. The method according to claim 1, further comprising storing the desired parking position to allow the user to reuse the desired parking position.

4. The method according to claim 1, further comprising determining attachment of an object to the vehicle, wherein the vehicle dimensions also comprise dimensions of the attached object.

5. The method according to claim 4, further comprising determining a bounding box around the vehicle and the attached object, the bounding box being utilized during the virtual parking procedure.

6. The method according to claim 1, further comprising generating the three-dimensional vehicle model based on the vehicle dimensions; and
allowing the user to selectively place the three-dimensional vehicle model in the parking space.

7. A system, comprising:
a vehicle platform comprising a processor and memory, the processor executing instructions stored in the memory to:
determine a current vehicle position and vehicle dimensions of a vehicle; and
receive a desired parking position for the vehicle with respect to a parking space, through an augmented reality interface, the augmented reality interface comprising a three-dimensional vehicle model based on the vehicle dimensions, the three-dimensional vehicle model being placed onto images or a physical scene of the parking space, the augmented reality interface being configured to allow a user to selectively place the three-dimensional vehicle model in the parking space to determine the desired parking position; and
an automatic parking system configured to cause the vehicle to autonomously park in the desired parking position based on a virtual parking procedure,
wherein the desired parking space is customizable in order to allow the vehicle to be parked offset from a middle of the parking space.

8. The system according to claim 7, further comprising an attachment sensing device that is configured to determine attachment of an object to the vehicle, wherein the automatic parking system is configured to cause the vehicle to autonomously park in the desired parking position without adjusting the desired parking position, and wherein the vehicle model has an adjustable transparency level in order to allow the user to see what is around the vehicle model when parked in the desired parking position.

9. The system according to claim 8, further comprising a sensor platform that is configured to determine a position and dimensions of the attached object.

10. The system according to claim 9, further comprising an augmented reality device comprising a processor and memory, the processor executing instructions stored in the memory to receive from the vehicle platform the vehicle dimensions, the instructions comprising:
a virtual content generator that:
obtains images or a 3D scan of the parking space;
generates the three-dimensional vehicle model based on the vehicle dimensions; and
determines parking space dimensions of the parking space;
a virtual content manipulator that allows the user to selectively place the three-dimensional vehicle model using the parking space dimensions of the parking space;
a collision calculation and avoidance module that determines clearance of the vehicle with respect to a physical object adjacent to the parking space as the vehicle is being virtually driven into the parking space during the virtual parking procedure;
a virtual display registration and rendering module that generates an augmented reality display that includes the three-dimensional vehicle model relative to the parking space; and
a parking position generator that determines the desired parking position for the vehicle, the desired parking position being transmitted to the vehicle platform.

11. The system according to claim 10, wherein the automatic parking system is configured to: receive the desired parking position;
determine an autonomous parking procedure based on the current vehicle position and the desired parking position; and
execute the autonomous parking procedure to park the vehicle in the desired parking position.

12. The system according to claim 10, wherein the three-dimensional vehicle model includes the dimensions of the attached object in combination with the vehicle dimensions.

13. The system according to claim 12, wherein the dimensions of the attached object are represented as a bounding box in combination with the three-dimensional vehicle model.

14. The system according to claim 10, wherein the collision calculation and avoidance module determines clearance by comparing surfaces of the three-dimensional vehicle model with physical constraints imposed by the physical object as the three-dimensional vehicle model changes position.

15. The system according to claim 14, wherein the sensor platform of the vehicle scans the physical object to determine the physical constraints.

16. The system according to claim 10, wherein the virtual content generator is configured to alert the user when a collision is detected between the three-dimensional vehicle model and the physical object.

17. The system according to claim 16, wherein the collision calculation and avoidance module is configured to determine a suggested parking position for the vehicle based on the collision, the suggested parking position being displayed to the user.

18. The system according to claim 10, wherein the parking position generator is configured to compute a relative position and orientation of the three-dimensional vehicle model in the desired parking position from the current vehicle position of the vehicle.

19. The system according to claim 18, wherein the vehicle platform is configured to store the desired parking position to allow the user to reuse the desired parking position.

20. The system according to claim 19, wherein the vehicle platform is configured to:

determine that the vehicle is at the parking space;
retrieve the desired parking position that is stored in memory; and
cause the vehicle to park in the parking space at the desired parking position.

\* \* \* \* \*